(12) United States Patent
Yan et al.

(10) Patent No.: US 9,980,191 B2
(45) Date of Patent: *May 22, 2018

(54) INTERFERENCE INFORMATION PROCESSING METHOD AND DEVICE

(71) Applicant: CHINA ACADEMY OF TELECOMMUNICATIONS TECHNOLOGY, Beijing (CN)

(72) Inventors: Nan Yan, Beijing (CN); Haitao Li, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 127 days.

This patent is subject to a terminal disclaimer.

(21) Appl. No.: 14/927,419

(22) Filed: Oct. 29, 2015

(65) Prior Publication Data

US 2016/0050603 A1    Feb. 18, 2016

Related U.S. Application Data

(62) Division of application No. 13/876,477, filed as application No. PCT/CN2011/080038 on Sep. 22, 2011, now Pat. No. 9,210,634.

(30) Foreign Application Priority Data

Sep. 27, 2010    (CN) .......................... 2010 1 0293295

(51) Int. Cl.
*H04W 36/00* (2009.01)
*H04W 36/20* (2009.01)

(52) U.S. Cl.
CPC ........ *H04W 36/20* (2013.01); *H04W 36/0083* (2013.01)

(58) Field of Classification Search
None
See application file for complete search history.

(56) References Cited

U.S. PATENT DOCUMENTS 8,644,252 B2 *   2/2014   Wager .............. H04W 36/0055
                                              370/331
9,210,634 B2 * 12/2015   Yan ....................... H04W 36/20
(Continued)

FOREIGN PATENT DOCUMENTS

WO    2008/096240 A1    8/2008

OTHER PUBLICATIONS

From European Application No. 11828083.3, Supplementary European Search Report and Opinion dated Jun. 19, 2017.

*Primary Examiner* — Hassan Phillips
*Assistant Examiner* — Gautam Sharma
(74) *Attorney, Agent, or Firm* — Ladas & Parry, LLP (57) ABSTRACT

Disclosed are an interference information processing method and device. The method comprises: a user terminal determining completion of reestablishment of an RRC connection; and the user terminal reporting interference indication information to a target cell. In the embodiment of the present invention, after a connection is established between the user terminal and a target cell except a source cell, the target cell may obtain interference indication information of the user terminal through the user terminal or the source cell, so as to avoid in-device interference of the user terminal according to the interference indication information of the user terminal.

5 Claims, 4 Drawing Sheets

401 — The base station that the target cell locates in receives the interference indication information of the UE during UE switching or reestablishment of an RRC connection 402 — The base station that the target cell locates in controls to avoid in-device interference of the UE according to the interference indication information of the UE (56) References Cited

U.S. PATENT DOCUMENTS

| | | | |
|---|---|---|---|
| 2008/0268833 A1 | 10/2008 | Huang et al. | |
| 2011/0250880 A1* | 10/2011 | Olsson | H04W 76/027 455/423 |
| 2011/0268085 A1* | 11/2011 | Barany | H04W 36/0033 370/331 |
| 2011/0287805 A1* | 11/2011 | Kaminski | H04W 36/08 455/525 |
| 2011/0319118 A1* | 12/2011 | Yu | H04W 52/40 455/522 |
| 2013/0156008 A1* | 6/2013 | Dinan | H04B 7/0456 370/332 |
| 2013/0223409 A1* | 8/2013 | Jung | H04W 36/20 370/331 |
| 2014/0133465 A1* | 5/2014 | Johansson | H04W 24/04 370/332 |
| 2014/0213267 A1* | 7/2014 | Chai | H04W 76/028 455/450 |
| 2014/0247811 A1* | 9/2014 | Singh | H04W 36/0033 370/332 |

\* cited by examiner

INTERFERENCE INFORMATION PROCESSING METHOD AND DEVICE

This application claims the benefit of and is a divisional of U.S. patent application Ser. No. 13/876,477 filed on Mar. 27, 2013, which is the U.S. national stage of International Patent Application No. PCT/CN2011/080038 filed on Sep. 22, 2011, which claims priority to Chinese Patent Application No. 201010293295.8 filed on Sep. 27, 2010, the disclosures of which are hereby incorporated by reference in their entireties.

The application requires the priority of Chinese patent application, which was submitted to the Chinese Patent Office on Sep. 27, 2010, the application No. 2010102932958, invention name as "Interference Information Processing Method and Device".

FIELD OF THE PRESENT INVENTION

The present invention relates to communication field, in particular to an interference information processing method and equipment.

BACKGROUND OF THE PRESENT INVENTION

Intelligent terminal equipment requires that the same equipment supports a plurality of radio access technology. For example, the same equipment supports LTE (Long Term Evolution) and ISM (Industrial Scientific Medical) (including Bluetooth, WLAN (radio Local Area Network, etc.), LTE and GPS (Global Positioning System) technology at the same time. If these radio access technologies in the same equipment adopt single RF module design, the interference between them shall be inevitable, in particular to the application scene with part of overlapping band or adjacent band.

For example, co-existing interference of equipment between high frequency part of LTE Band 40 (2300 MHz-2400 MHz) and access technology of ISM band (such as 2.4 GHz-2.4835 GHz of WLAN); as shown in Table 1:

TABLE 1

| LTE | ISM | Interference Status |
| --- | --- | --- |
| Receive | Send | LTE: interfered by ISM, ISM: work normally |
| Send | Receive | LTE: work normally, ISM: interfered by LTE |
| Receive | Receive | No co-existing interference |
| Send | Send | No co-existing interference |

Or co-existing interference of equipment between LTE Band 13 (777-787 MHz, 746-756 MHz) or Band 14 (788-798 MHz, 758-768 MHz) and GPS (such as 1575.42 MHz) technology; as shown in Table 2:

TABLE 2

| LTE | GPS | Interference Status |
| --- | --- | --- |
| Send | Receive | LTE: work normally, GPS: interfered by LTE |
| Receive | Receive | No co-existing interference |

It should be noted that, a radio system has no interference on other systems when in IDLE status (LTE monitoring paging, WLAN monitoring beacon and Bluetooth sniff).

When a base station of the LTE system is deployed in a plurality of bands, UE (User Equipment) is actually the band that can avoid the in-device interference. Co-existing interference of frequency domain is solved mainly depending on the reestablishment of a radio link after failure and handover process of control at network side. When the UE is located in interference band, quality of the radio link detected by the UE is worsened, which will cause failure of radio link. The UE can select to establish connection in the cell of non-interference band through triggering a reestablishment of connection. The UE is required to provide the base station with certain information when the UE is reporting auxiliary base station handover process and base station blind handover process base on measurement, so that the base station configures for measurement of interference band to avoid handover the UE into interference band. The information that the UE transfers to the base station is called interference indication information.

Interference indication information transferred to the base station by the UE under connection state can assist the base station to avoid interference with the purpose of not affecting the user experience. When the UE triggers to be reconstructed or switched to other cells under connection state due to failure of radio link, the target base station is required to be able to avoid rehandover the UE to interference band. However, the target base station in prior art cannot acquire the interference indication information of the UE and cannot effectively avoid rehandover the UE to interference band.

SUMMARY OF THE PRESENT INVENTION

The embodiments of the present invention provide an interference information processing method and equipment, which enables that the target cell can acquire interference indication information of the UE when setting up connection in the target cell other than the UE and a source cell.

The embodiments of the present invention provide an interference information processing method, which comprises:

A user terminal determining completion of reestablishment of an RRC;

The user terminal reporting interference indication information to the target cell.

The embodiments of the present invention provide an interference information processing method, which comprises:

The user terminal determining completion of cell handover;

The user terminal reporting interference indication information to the target cell.

The embodiments of the present invention provide an interference information processing method, which comprises:

The source cell judging whether the UE is switched;

The source cell sending the interference indication information reported by the UE to the target cell during UE handover.

The embodiments of the present invention provide an interference information processing method, which comprises:

The base station that the target cell locates in receiving the interference indication information of the UE during UE handover or reestablishment of an RRC connection;

The base station that the target cell locates in controlling to avoid in-device interference of the UE according to the interference indication information of the UE.

The embodiments of the present invention provide a user terminal, which comprises:

Determination unit, which is used to determine completion of reestablishment of an RRC connection;

Reporting unit, which is used to report the interference indication information to the target cell.

The embodiments of the present invention provide a user terminal, which comprises:

Determination unit, which is used to determine completion of cell handover;

Reporting unit, which is used to report the interference indication information to the target cell.

The embodiments of the present invention provide a base station, which comprises:

Judgment unit, which is used to judge whether the UE is switched;

Sending unit, which is used to send the interference indication information reported by the UE to the target cell during UE handover.

The embodiments of the present invention provide a base station, which comprises:

Receiving unit, which is used to receive the interference indication information of the UE during UE handover or reestablishment of an RRC connection;

Control unit, which is used to control to avoid in-device interference of the UE according to the interference indication information of the UE.

Compared with the prior art, the embodiments of the present invention at least have the following advantages:

The target cell can acquire the interference indication information of the user terminal through the user terminal or the source cell after the user terminal is connected to the target cell rather than the source cell, so as to further avoid the in-device interference of the user terminal according to the interference indication information of the user terminal.

BRIEF DESCRIPTION OF THE DRAWINGS

To describe the embodiments or the technical programs in prior art of the present invention clearly, brief description of the drawing required to be used in embodiments or prior art description of the present invention is made. It is clear that the drawings in descriptions below are only some embodiments of the present invention. Technical personnel of the field can acquire other drawings according to these drawings in the absence of creative work.

DETAILED DESCRIPTION OF THE EMBODIMENTS OF THE PRESENT INVENTION

In the following parts, clear and complete descriptions of the technology programs in embodiments of the present invention are made combined with drawings of the embodiments. It is clear that the embodiments described here are only parts of the embodiments of the present invention. According to the embodiments of the present invention, any other embodiments made by technical personnel of the field in the absence of creative work all belong to the scope of the patent protection of the invention.

Embodiment I

Figure 1:
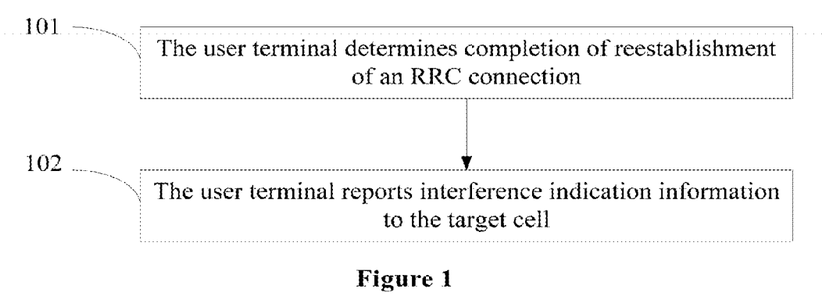
FIG. 1 is a flow diagram of interference information processing method of embodiment I of the present invention.

Embodiment I of the present invention provides an interference information processing method, as shown in FIG. 1, which comprises:

Step 101, the user terminal determines completion of reestablishment of an RRC (Radio Resource Control) connection.

Step 102, the user terminal reports the interference indication information to the target cell.

During connection reestablishment of the UE, working status of other radio equipment in equipment may not change (such as startup or shutdown); the UE will not receive again the interference indication information triggered and sent in equipment after connection reestablishment under normal condition. If the user terminal has reported the interference indication information before the reestablishment of an RRC connection, the user terminal reports the interference indication information to the target cell, comprising: the user terminal reporting the interference indication information repeatedly. The reason the UE does no report the interference indication information to the target cell before connection reestablishment may lay in that there is no co-existing in-device interference, so it is allowed not to report the interference indication information after connection reestablishment.

The user terminal reports the interference indication information to the target cell, comprising: the user terminal judges whether there is new co-existing interference triggered after reestablishment of an RRC connection; if not, the user terminal reports the interference indication information repeatedly; if yes, the user terminal triggers and updates the interference indication information according to the new co-existing interference and then reports it.

Embodiment II

Figure 2:
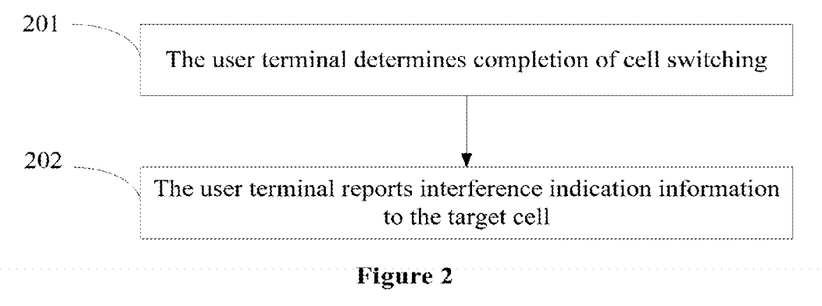
FIG. 2 is a flow diagram of interference information processing method of embodiment II of the present invention.

Embodiment II of the present invention provides an interference information processing method, as shown in FIG. 2, which comprises:

Step 201, the user terminal determines the completion of cell handover;

Step 202, the user terminal reports the interference indication information to the target cell.

During UE handover, working status of other radio equipment in equipment may not change (such as startup or shutdown); the UE will not receive again the interference indication information triggered and sent in equipment after handover under normal condition. It is specified in the program that the UE reports the interference indication information repeatedly after handover to inform to switch target cell to avoid interference and other related operations, viz. if the user terminal has reported the interference indication information before cell handover, the user terminal reports the interference indication information to the target cell, comprising: the user terminal reporting the interference indication information repeatedly. If the UE does no report the interference indication information to the target cell before handover, the UE will not report repeatedly after handover. The reason for the UE does not report the interference indication information may lay in there is no co-existing interference triggered in equipment.

The user terminal reports the interference indication information to the target cell, comprising: the user terminal judges whether there is new co-existing interference triggered after cell handover; if not, the user terminal reports the interference indication information repeatedly; if yes, the user terminal triggers and updates the interference indication information according to the new co-existing interference and then reports it.

Embodiment III

Figure 3:
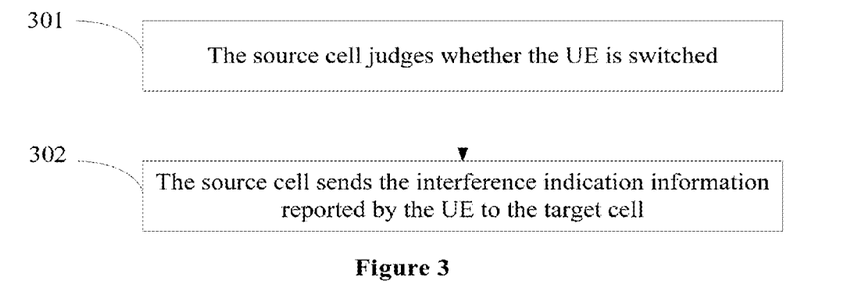
FIG. 3 is a flow diagram of interference information processing method of embodiment III of the present invention.

Embodiment III of the present invention provides an interference information processing method, as shown in FIG. 3, which comprises:

Step 301, the source cell judges whether the UE is switched;

Step 302, the source cell sends the interference indication information reported by the UE to the target cell during UE handover.

The source cell sends the interference indication information reported by the UE to the target cell, comprising: the source cell sending the interference indication information to the target cell by carrying it in context of the user terminal.

The source cell will transfer the UE context saved therein to the target network side through handover preparation message when judging the UE is under handover, and the target network side will issue handover command to the UE through a source network side, viz. RRC connects and reconfigures message, and the UE switches.

It should be noted that of the source cell does not receive the interference indication information reported by the UE when sending the handover preparation message, or sending UE context, the interference indication information will not be carried in the message sent to the target cell.

Embodiment IV

Figure 4:
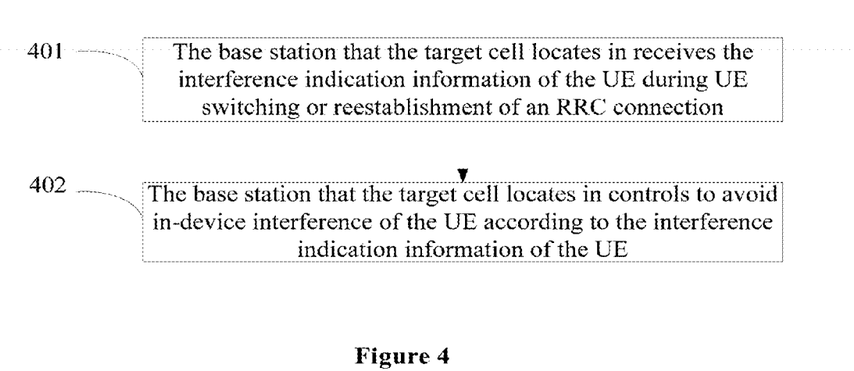
FIG. 4 is a flow diagram of interference information processing method of embodiment IV of the present invention.

Embodiment IV of the present invention provides an interference information processing method, as shown in FIG. 4, which comprises:

Step 401, the base station that the target cell locates in receives the interference indication information of the UE during UE handover or reestablishment of an RRC connection;

Step 402, the base station that the target cell locates in controls to avoid the interference in UE equipment according to the interference indication information of the UE.

The received interference indication information of the UE comprises: receiving the interference indication information sent by the UE or the source cell during UE handover; receiving the interference indication information sent by the UE during reestablishment of an RRC connection of the UE.

The received interference indication information sent by the source cell is specifically carried in the UE context, or interface message (such as S1 interface message and S2 interface message).

After receiving the request of reestablishment of an RRC connection from the UE, it means reestablishment succeeds if the UE context is saved, otherwise, the reestablishment fails.

Embodiment V

Figure 5:
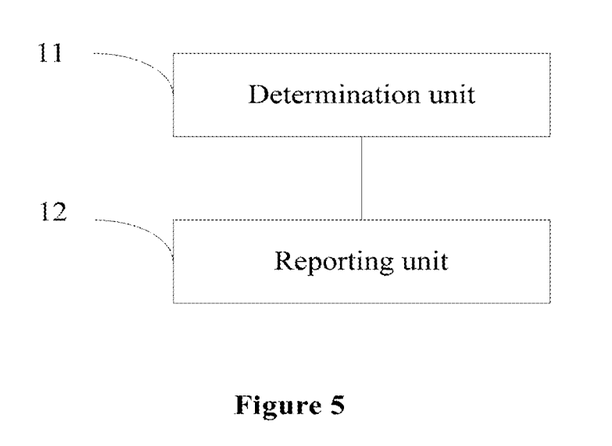
FIG. 5 is a structural diagram of user terminal of embodiment V of the present invention.

Embodiment V of the present invention provides a user terminal, as shown in FIG. 5, which comprises:

Determination unit 11, which is used to determine the completion of reestablishment of an RRC connection;

Reporting unit 12, which is used to report the interference indication information to the target cell.

The reporting unit 12 is also used to report the interference indication information repeatedly if the user terminal has reported the interference indication information before the reestablishment of an RRC connection.

The reporting unit 12 is also used to:

Judge whether there is new co-existing interference triggered after the reestablishment of an RRC connection;

If not, report the interference indication information repeatedly;

If yes, trigger and update the interference indication information according to the new co-existing interference and then report it.

Embodiment VI

Figure 6:
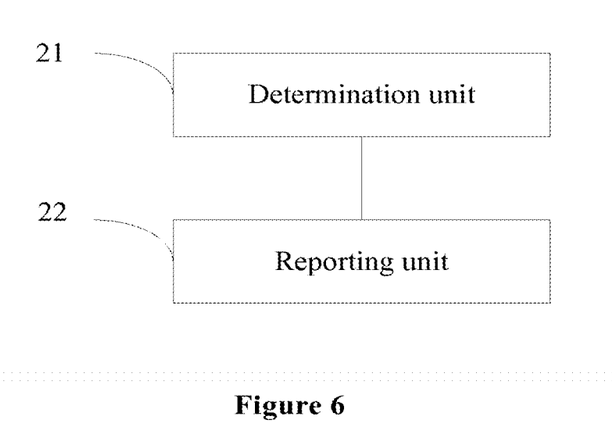
FIG. 6 is a structural diagram of user terminal of embodiment VI of the present invention.

Embodiment VI of the present invention provides a user terminal, as shown in FIG. 6, which comprises:

Determination unit 21, which is used to determine the completion of cell handover;

Reporting unit 22, which is used to report the interference indication information to the target cell.

The reporting unit 22 is also used to report the interference indication information repeatedly if the user terminal has reported the interference indication information before the cell handover.

The reporting unit 22 is also used to:

Judge whether there is new co-existing interference triggered after the cell handover;

If not, report the interference indication information repeatedly;

If yes, trigger and update the interference indication information according to the new co-existing interference and then report it.

Embodiment VII

Figure 7:
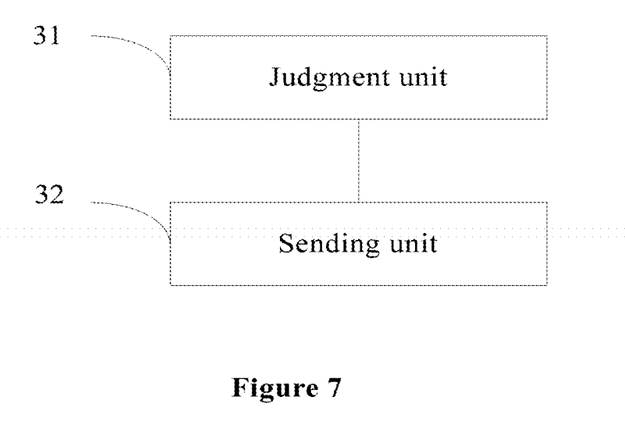
FIG. 7 is a structural diagram of base station of embodiment VII of the present invention.

Embodiment VII of the present invention provides a base station, as shown in FIG. 7, which comprises:

Judgment unit 31, which is used to judge whether the UE is switched;

Sending unit 32, which is used to send the interference indication information reported by the UE to the target cell during UE handover.

The sending unit 32 is also used to send the interference indication information to the target cell by carrying it in the context of the user terminal or the interface message.

The sending unit 32 is also used to send the interference indication information to the target cell through handover preparation message when the source cell judges the UE is switched.

Embodiment VIII

Figure 8:
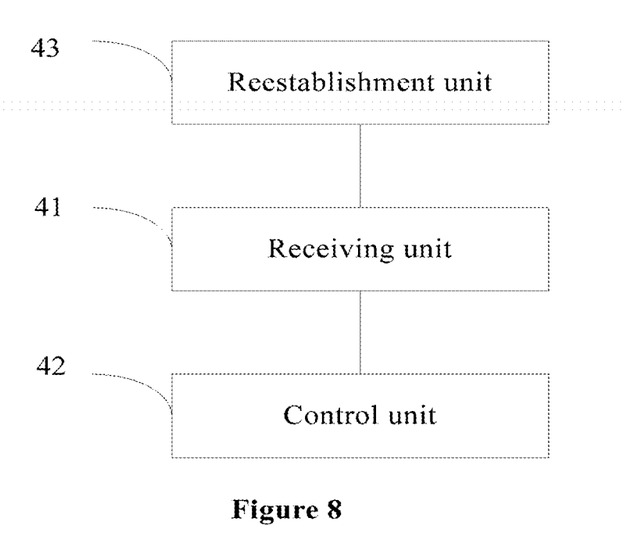
FIG. 8 is a structural diagram of base station of embodiment VIII of the present invention.

Embodiment VIII of the present invention provides a base station, as shown in FIG. 8, which comprises:

Receiving unit 41, which is used to receive the interference indication information of the UE during UE handover or reestablishment of an RRC connection;

Control unit 42, which is used to control to avoid the in-device interference of the UE according to the interference indication information of the UE.

The receiving unit 41 is also used to receive the interference indication information sent by the UE or the source cell during UE handover; receive the interference indication information sent by the UE during reestablishment of an RRC connection of the UE.

The receiving unit 41 is also used to receive the UE context or the interface message sent by the source cell; the context or the interface message carries the interference indication information.

Through the description of the embodiments above, the technical personnel in this field can understand clearly that the present invention can be implemented by software and necessary general hardware platform or hardware (the former is better in most cases). Based on this understanding, the technical program or the part making contributions to the prior art of the present invention can be embodied by a form of software products essentially which can be stored in a storage medium, including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

The invention claimed is:

1. A method for processing interference information, comprising:
   determining, by a user terminal, completion of cell handover; and
   reporting, by the user terminal, interference indication information to a target cell repeatedly, in a case that the user terminal has reported the interference indication information before the cell handover,
   wherein the target cell is a cell among cells to which the user terminal is to connect by the reestablishment of the Radio Resource Control RRC connection or is to connect by handover, except a source cell that is currently providing service to the user terminal; and
   wherein the interference indication information is information that is used to prevent the user terminal from being switched to interference frequency bands,
   wherein the reporting, by the user terminal, the interference indication information to the target cell comprises:
   determining, by the user terminal, whether there is a new mutual interference trigger after the cell handover; and
   reporting, by the user terminal, the interference indication information repeatedly, if there is not; or
   updating, by the user terminal, the interference indication information according to the new mutual interference trigger, and then reporting the updated information, if there is,
   wherein the mutual interference trigger indicates that the reestablishment of the RRC connection is triggered due to mutual interference among a plurality of different wireless access technologies supported by the user terminal.

2. A user terminal, comprising:
   a processor;
   a memory, connected with the processor via a bus interface, and used to store programs and data used by the processor when performing operations; and
   a transceiver, connected with the processor and the memory via the bus interface and used to receive and send data under the control of the processor,
   wherein when the processor calls and executes the program and data stored in the memory, the processor is used to:
   determine completion of cell handover; and
   report interference indication information to a target cell repeatedly, in a case that the user terminal has reported the interference indication information before the cell handover,
   wherein the target cell is a cell among cells to which the user terminal is to connect by the reestablishment of the Radio Resource Control RRC connection or is to connect by handover, except a source cell that is currently providing service to the user terminal; and
   wherein the interference indication information is information that is used to prevent the user terminal from being switched to interference frequency bands,
   wherein the processor is further used to:
   determine whether there is a new mutual interference trigger after the cell handover; and
   report, the interference indication information repeatedly, if there is not; or
   update the interference indication information according to the new mutual interference trigger, and then reporting the updated information, if there is,
   wherein the mutual interference trigger indicates that the reestablishment of the RRC connection is triggered due to mutual interference among a plurality of different wireless access technologies supported by the user terminal.

3. A base station, comprising:
   a processor;
   a memory, connected with the processor via a bus interface, and used to store programs and data used by the processor when performing operations; and
   a transceiver, connected with the processor and the memory via the bus interface and used to receive and send data under the control of the processor,
   when the processor calls and executes the program and data stored in the memory, the processor is used to:
   determine whether a user terminal is subject to handover;
   send interference indication information reported by the user terminal to a target cell during the user terminal is subject to handover,
   wherein the target cell is a cell among cells to which the user terminal is to connect by the reestablishment of the Radio Resource Control RRC connection or is to connect by handover, except a source cell that is currently providing service to the user terminal; and
   wherein the interference indication information is information that is used to prevent the user terminal from being switched to interference frequency bands,
   wherein the processor is further used to:
   receive the interference indication information repeatedly if the user terminal determines that there is not a new mutual interference trigger after the cell handover; or
   receive the interference indication information updated by the user terminal according to the new mutual interference trigger if the user terminal determines that there is the new mutual interference trigger after the cell handover;

wherein the mutual interference trigger indicates that the reestablishment of the RRC connection is triggered due to mutual interference among a plurality of different wireless access technologies supported by the user terminal.

4. The base station according to claim 3, wherein the processor is further used to:

send the interference indication information to the target cell by carrying it in a context of the user terminal or a interface message.

5. The base station according to claim 3, wherein the processor is further used to:

send the interference indication information to the target cell through handover preparation message when a source cell determines that the user terminal is subject to handover.

* * * * *